US008570730B2

(12) United States Patent
Li

(10) Patent No.: US 8,570,730 B2
(45) Date of Patent: Oct. 29, 2013

(54) MOUNTING APPARATUS FOR PCI CARD

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 295 days.

(21) Appl. No.: 13/212,482

(22) Filed: Aug. 18, 2011

(65) Prior Publication Data

US 2012/0236520 A1 Sep. 20, 2012

(30) Foreign Application Priority Data

Mar. 18, 2011 (CN) .......................... 2011 1 0065708

(51) Int. Cl.
G06F 1/16 (2006.01)
H05K 7/00 (2006.01)
H05K 5/00 (2006.01)
H05K 7/14 (2006.01)
H01R 13/62 (2006.01)

(52) U.S. Cl.
USPC ................. 361/679.32; 361/679.31; 361/747; 361/759; 361/801; 439/160

(58) Field of Classification Search
USPC ........................ 361/679.31, 679.32, 801, 802, 361/807–810, 752, 790, 747, 759; 439/160
See application file for complete search history.

(56) References Cited

U.S. PATENT DOCUMENTS

| 7,002,811 | B2 * | 2/2006 | Jing et al. | 361/801 |
| 7,130,200 | B1 * | 10/2006 | Liu | 361/801 |
| 7,593,238 | B2 * | 9/2009 | Tang | 361/801 |
| 7,672,144 | B2 * | 3/2010 | Yeh et al. | 361/801 |
| 2009/0262508 | A1 * | 10/2009 | Fukui et al. | 361/759 |

* cited by examiner

Primary Examiner — Jayprakash N Gandhi
Assistant Examiner — Nidhi Desai
(74) Attorney, Agent, or Firm — Altis & Wispro Law Group, Inc.

(57) ABSTRACT

A mounting apparatus for a PCI card includes an enclosure, a mounting bracket, a securing bracket mounted in the enclosure, and a securing member slidably mounted on the securing bracket. The mounting bracket secures a first terminal of the PCI card. The securing bracket includes a main body and an elastic piece extending from the main body. The elastic piece comprises a piece body and a securing protrusion. The securing member includes a pressing panel and a securing portion extending from the pressing panel. The securing member slides relative to the main body to enable the securing protrusion to engage with the securing portion and enable the pressing panel to press a second terminal of the PCI card.

13 Claims, 6 Drawing Sheets

MOUNTING APPARATUS FOR PCI CARD

CROSS-REFERENCE TO RELATED APPLICATIONS

This application is related to co-pending U.S. Patent Application entitled "MOUNTING APPARATUS FOR PCI CARD,"U.S. application Ser. No. 13/212,479 filed on Aug. 18, 2011.

BACKGROUND

1. Technical Field

The disclosure generally relates to mounting apparatuses, especially to a mounting apparatus for a peripheral component interconnect (PCI) card.

2. Description of Related Art

PCI cards including network cards, monitor cards, and sound cards, are widely used in a computer. The conventional method for mounting PCI cards usually involves screws and screwdrivers in a tedious endeavor often resulting in lost screws. A screw falling on the printed circuit board (PCB) can result in damage to the PCB.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
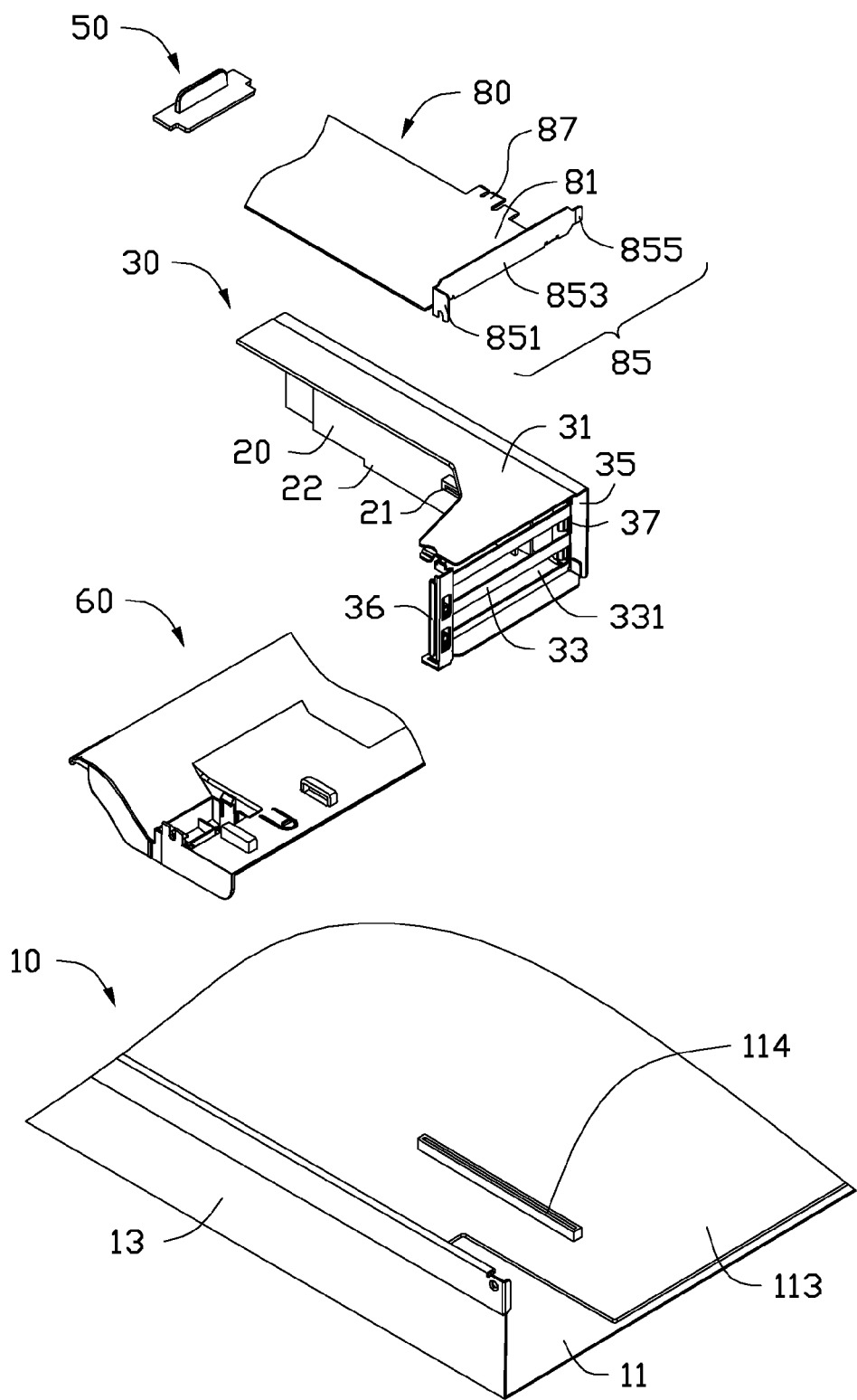
FIG. 1 is an exploded, isometric view of an embodiment of a mounting apparatus for PCI cards.

Referring to FIG. 1, an embodiment of a mounting apparatus for one PCI card 80 is shown. In the embodiment, a PCI card 80 is used. The mounting apparatus includes an enclosure 10, a mounting bracket 30 mounted on the PCI card 80, a securing member 50, and a securing bracket 60 mounted to the enclosure 10.

Figure 4:
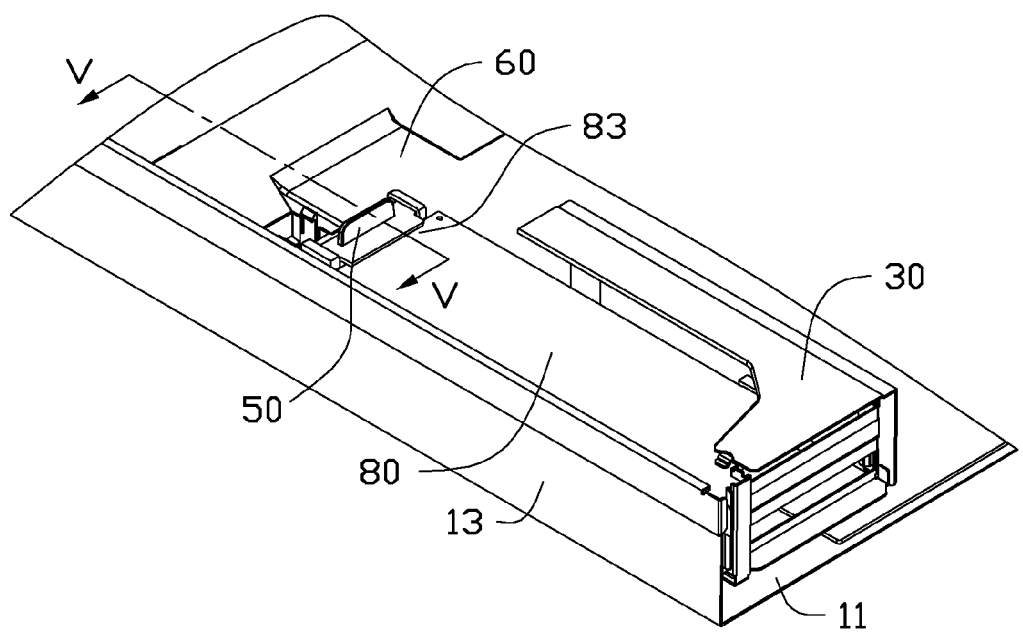
FIG. 4 is an assembled view of FIG. 1.
Figure 5:
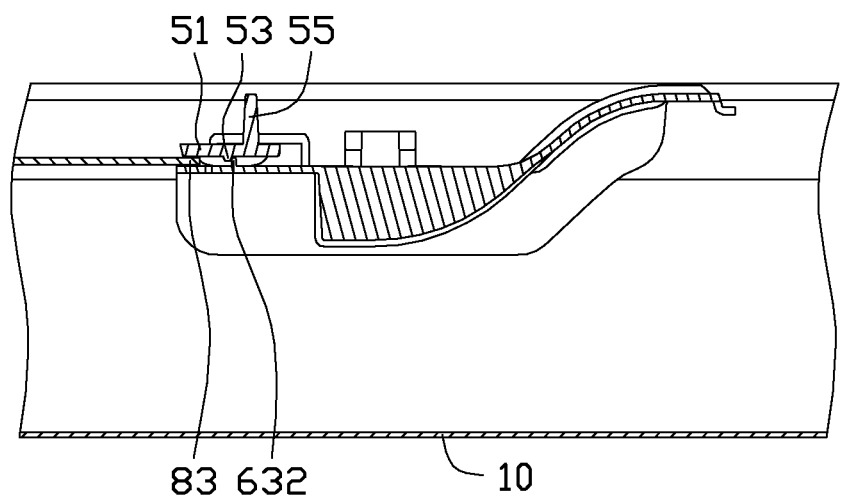
FIG. 5 is a cross section view of FIG. 4, taken along lines V-V.

The PCI card 80 includes a first terminal 81 and a second terminal 83 (shown in FIG. 4). The first terminal 81 is mounted to a mounting piece 85. The mounting piece 85 includes a mounting portion 851, a main portion 853 extending from the mounting portion 851, and an inserting portion 855 extending from the main portion 855. The PCI card 80 includes an inserting terminal 87 close to the first terminal 81.

The enclosure 10 includes a bottom panel 11 and a side panel 13 substantially perpendicular to the bottom panel 11. A printed circuit board (PCB) 113 mounted on the bottom panel 11. The PCB 113 defines an insertion slot 114. The bottom panel 11 is substantially parallel to the PCI card 80.

The mounting bracket 30 includes a top plate 31, a rear plate 33, and a side plate 35. The rear plate 33 defines a plurality of elongated slots 331. The rear plate 33 includes a blocking tab 36. The side plate 35 defines a plurality of openings 37 corresponding to the inserting portion 855 of the mounting piece 85. A converting card 20 is mounted to the side plate 35. The converting card 20 defines a converting slot 21 corresponding to the inserting terminal 87 and includes an inserting head 22 corresponding to the insertion slot 114 of the PCB 113.

Figure 2:
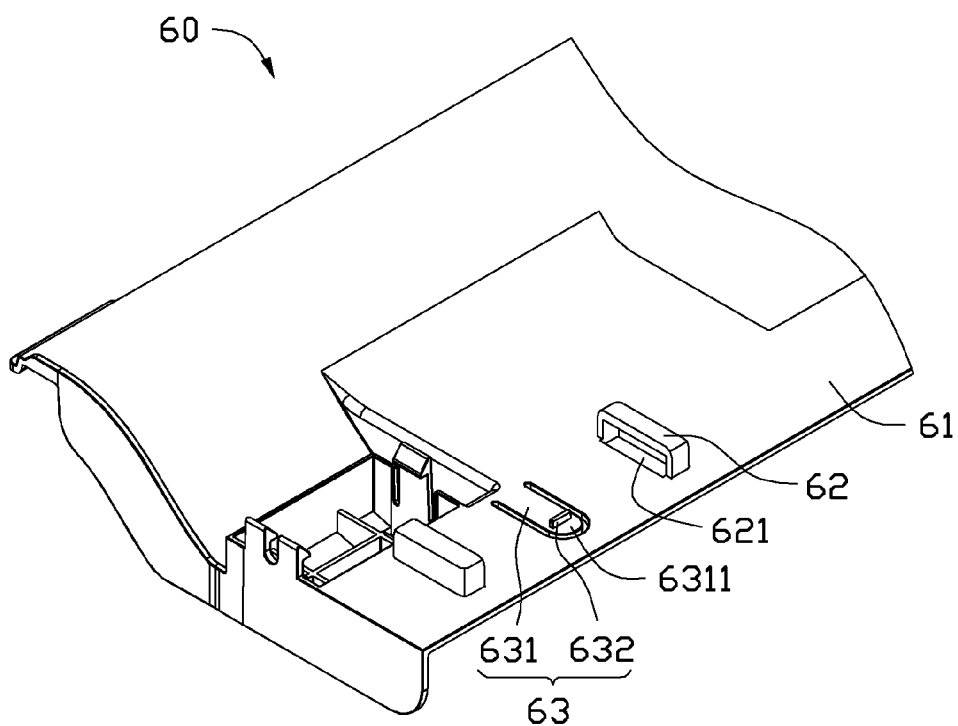
FIG. 2 is an isometric view of a securing bracket of FIG. 1.

Referring to FIG. 2, the securing bracket 60 includes a main body 61, two sliding portions 62 extending from the main body 61, and an elastic piece 63 extending from the main body 61. The elastic piece 63 includes a piece body 631 and a securing protrusion 632 extending from a free end 6311 of the piece body 631. The main body 61 and the piece body are on the same plane. Each sliding portion 62 defines a sliding slot 621. An extending direction of the sliding slot 621 is substantially parallel to the main body 61.

Figure 3:
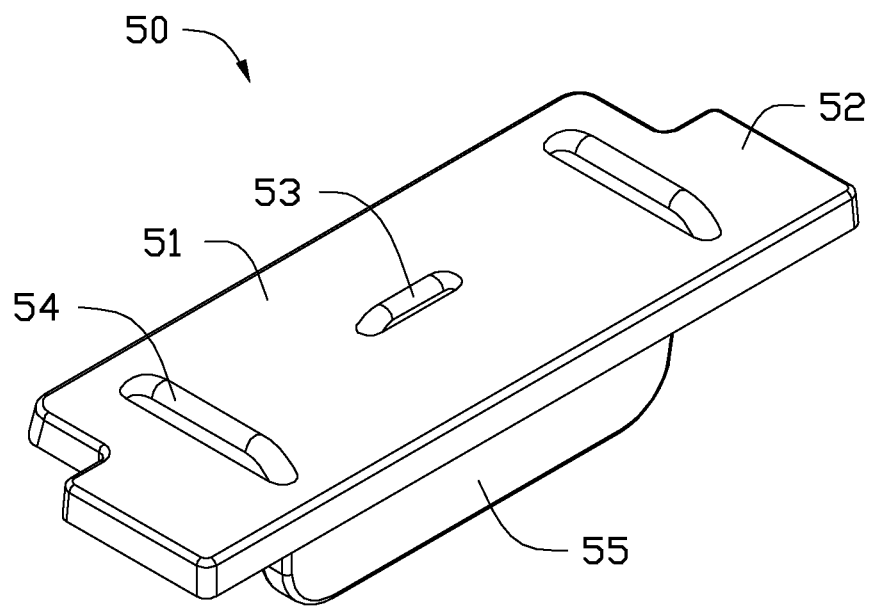
FIG. 3 is an isometric view of a securing member of FIG. 1.
Figure 6:
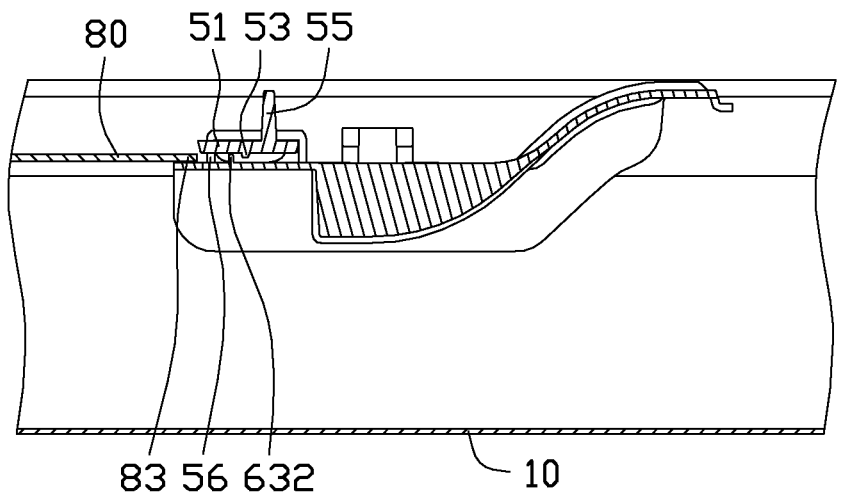
FIG. 6 is similar to FIG. 5, except the securing member in a sliding status.

Referring to FIG. 3, the securing member 50 includes a pressing panel 51 and two sliding protrusions 52 extending from opposite sides of the pressing panel 51, a securing portion 53 extending from the pressing panel 51, and two support portions 54 extending from the pressing portion 51. The pressing panel 51 is substantially parallel to the main body 61 and the securing bracket 60. The two sliding protrusions 52 are slidably mounted in the sliding slots 621 of the securing bracket 60. The securing portion 53 engages the securing protrusion 632 of the elastic piece 63. The support portions 54 are placed on the main body 61 to form a receiving space 56 (shown in FIG. 6) between the pressing panel 51 and the main body 61. The receiving space 56 receives the second terminal 83 of the PCI card 80. The securing member 50 further includes a handle 55 extending from the pressing panel 51. The handle 51 is substantially perpendicular to the pressing panel 51.

Referring to FIGS. 1 to 6, in assembly of the securing member 50 to the securing bracket 60, the sliding protrusions 52 of the securing member 50 are mounted in the sliding slots 621 of the securing bracket 60, thereby enabling the securing member 50 to slide along the sliding slots 621. The securing bracket 60 is secured to the bottom panel 11 of the enclosure 11 via a plurality of screws (not shown).

The inserting portion 855 of the PCI card 80 is received in the openings 37. The inserting terminal 87 is inserted into the converting slot 21 of the converting card 20. The mounting portion 851 abuts the blocking tab 36.

The inserting head 22 of the converting card 20 is inserted into the insertion slot 114. The second terminal 83 of the PCI card 80 is placed on the main body 61. The securing member 50 slides close to the PCI card 80 by pushing the handle 55 of the securing member 50. The securing portion 53 of the securing member 50 presses the securing protrusion 632 to resiliently deform. The securing member 50 slides further to enable the securing portion 53 to go over the securing protrusion 632. At this time, the securing protrusion 632 rebounds to engage the securing portion 53. The pressing panel 51 presses the second terminal 83 of the PCI card 80. The second terminal 83 is received in the receiving space 56.

In disassembly, the securing member 50 slides away from the PCI card 80 by manually pushing the handle 55. The securing portion 53 of the securing member 50 presses the securing protrusion 632 to resiliently deform. The securing member 50 slides further to enable the securing portion 53 to move over the securing protrusion 632. At this time, the securing protrusion 632 rebounds to disengage the securing portion 53 and the pressing panel 51 disengages from the second terminal 83 of the PCI card 80. Thus, the PCI card 80 can be easily removed from the enclosure 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for a PCI card, comprising: an enclosure; a mounting bracket securing a first terminal of the PCI card; a securing bracket mounted in the enclosure, the securing bracket comprising a main body and an elastic piece extending from the main body, the elastic piece comprising a piece body and a securing protrusion; and a securing member slidably mounted on the securing bracket, the securing member comprising a pressing panel and a securing portion extending from the pressing panel, the securing member slidable relative to the main body to enable the securing protrusion to engage with the securing portion and enable the pressing panel to press a second terminal of the PCI card; wherein the securing member further comprises a support portion extending from the pressing panel; the support portion is placed on the main body to form a receiving space between the pressing panel and the main body, and the receiving space is adapted to receive the second terminal; wherein the pressing panel is substantially parallel to the main body.

2. The mounting apparatus for a PCI card of claim 1, wherein the securing member further comprises two sliding protrusions extending from the pressing panel; the securing bracket comprises two sliding portions, each of the sliding portions defining a sliding slot corresponding to the sliding protrusion.

3. The mounting apparatus for a PCI card of claim 2, wherein an extending direction of the sliding slot is substantially parallel to the main body.

4. The mounting apparatus for a PCI card of claim 1, wherein the securing member further comprises a handle extending from the pressing panel to drive the securing member to slide by pushing the handle.

5. The mounting apparatus for a PCI card of claim 4, wherein the handle is substantially perpendicular to the pressing panel.

6. The mounting apparatus for a PCI card of claim 1, wherein the piece of body and the main body are on the same plane.

7. A PCI card assembly, comprising: an enclosure comprising a bottom panel and a side panel substantially perpendicular to the bottom panel; a PCI card substantially parallel to the bottom panel, the PCI card comprising a first terminal and a second terminal; a mounting bracket securing the first terminal of the PCI card; a securing bracket mounted in the enclosure, the securing member comprising a main body and an elastic piece extending from the main body; and a securing member slidably mounted on the securing bracket, the securing member comprising a pressing panel and a securing portion extending from the pressing panel, the securing member slidable relative to the main body to enable the elastic piece to engage with the securing portion and enable the pressing panel and the main body to receive the second terminal therebetween to prevent the second terminal from moving in a direction substantially perpendicular to the bottom panel; wherein the securing member further comprises a support portion extending from the pressing panel; the support portion is placed on the main body to form a receiving space between the pressing panel and the main body, the receiving space receiving the second terminal; wherein the pressing panel is substantially parallel to the main body.

8. The PCI card assembly of claim 7, wherein the elastic piece comprises a piece body and a securing protrusion engaging with the securing portion.

9. The PCI card assembly of claim 7, wherein the securing member further comprises two sliding protrusions extending from the pressing panel; the securing bracket comprises two sliding portions, each of the sliding portions defining a sliding slot corresponding to the sliding protrusion.

10. The PCI card assembly of claim 9, wherein an extending direction of the sliding slot is substantially parallel to the main body.

11. The PCI card assembly of claim 7, wherein the securing member further comprises a handle extending from the pressing panel to drive the securing member to slide by pushing the handle.

12. The PCI card assembly of claim 11, wherein the handle is substantially perpendicular to the pressing panel.

13. The PCI card assembly of claim 7, wherein the piece body and the main body are on the same place.

* * * * *